(12) United States Patent
Yu et al.

(10) Patent No.: US 12,361,082 B2
(45) Date of Patent: Jul. 15, 2025

(54) PROTECTING CLOUD SYSTEMS USING REQUEST SCORES

(71) Applicant: SAP SE, Walldorf (DE)

(72) Inventors: Xia Yu, Shanghai (CN); Dabin Feng, Shanghai (CN); Hui Li, Shanghai (CN); Baolin He, Shanghai (CN); Chen Feng, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/495,862

(22) Filed: Oct. 27, 2023

(65) Prior Publication Data

US 2025/0139179 A1     May 1, 2025

(51) Int. Cl.
  *G06F 16/9535*  (2019.01)
  *G06F 9/54*     (2006.01)
  *G06F 16/9538*  (2019.01)

(52) U.S. Cl.
  CPC .......... *G06F 16/9535* (2019.01); *G06F 9/547* (2013.01); *G06F 16/9538* (2019.01)

(58) Field of Classification Search
  CPC ... G06F 9/547; G06F 16/9535; G06F 16/9538
  See application file for complete search history.

(56) References Cited

U.S. PATENT DOCUMENTS

| | | | |
|---|---|---|---|
| 8,762,366 B1 | 6/2014 | Becerra et al. | |
| 9,043,362 B2 | 5/2015 | Weissman et al. | |
| 10,133,775 B1 | 11/2018 | Ramalingam et al. | |
| 10,534,774 B2 | 1/2020 | Obradovic et al. | |
| 11,222,013 B2 | 1/2022 | De Lima et al. | |
| 11,544,236 B2 | 1/2023 | Brown et al. | |
| 11,579,933 B2 | 2/2023 | Chen et al. | |
| 11,715,025 B2 | 8/2023 | Wen et al. | |
| 2010/0082320 A1 | 4/2010 | Wood et al. | |
| 2018/0336247 A1 | 11/2018 | Ignatyev et al. | |
| 2019/0324881 A1* | 10/2019 | Buffone | G06F 11/0793 |
| 2019/0355074 A1* | 11/2019 | Schwartz | G06Q 50/12 |

(Continued)

FOREIGN PATENT DOCUMENTS

| | | |
|---|---|---|
| CN | 111240959 | 6/2020 |
| CN | 113377521 | 9/2021 |

(Continued)

OTHER PUBLICATIONS

U.S. Appl. No. 18/659,088, filed May 9, 2024, Li.

(Continued)

*Primary Examiner* — Courtney Harmon
(74) *Attorney, Agent, or Firm* — Fish & Richardson P.C.

(57) ABSTRACT

Methods, systems, and computer-readable storage media for receiving a request through a web services API, the request comprising a query to query a database system, retrieving a set of weights that is specific to the web services, determining a factor score for each impact factor in a set of impact factors to provide a set of factor scores, providing a score total for the query based on the set of weights and the set of factor scores, returning a score response including the total score and at least one query suggestion, and receiving a modified request through the web services API, the modified request including the query modified to include at least a portion of the at least one query suggestion.

20 Claims, 5 Drawing Sheets

(56) References Cited

U.S. PATENT DOCUMENTS

| | | | |
|---|---|---|---|
| 2020/0320151 A1* | 10/2020 | Philips | G06Q 30/0282 |
| 2020/0410376 A1 | 12/2020 | Zhou et al. | |
| 2023/0153223 A1* | 5/2023 | Sankaranarayanan | G06F 11/3006 714/48 |
| 2024/0062021 A1* | 2/2024 | Tangari | G06F 16/2433 |

FOREIGN PATENT DOCUMENTS

| | | |
|---|---|---|
| WO | WO 2016084327 | 6/2016 |
| WO | WO 2019085754 | 5/2019 |
| WO | WO 2020119051 | 6/2020 |

OTHER PUBLICATIONS

Non-Final Office Action in U.S. Appl. No. 18/659,088, mailed on Mar. 27, 2025, 17 pages.

Wikipedia.org [online], "Ridge Regression" created on Mar. 2021, retrieved on May 9, 2024, retrieved from URL <https://en.wikipedia.org/wiki/Ridge_regression>, 9 pages.

* cited by examiner

```
{
    "score": 67,                                                              300
    "items": [
        {
            "actions": [
                ("recommendation 1":"For engineering side, decrease joins in
                    SQL. Review the design of each API entity, downgrade the
                    SQL join for one single entity."},
                ("recommendation 2":"For client side, if there are multiple
                    expand properties or deep level expand, reduce the expand
                    properties number and expand depth:
                        1)/User?$expand=hr$select=userId,username,hr/userId,hr/
                          username&$filter=department eq 'IT Services'&$orderby=
                          userId&$top"1000&$skip=500;
                        2)/User?$expand=manager$select=userId,username,manager/
                          username&$filter=department eq 'IT Services'&$orderby=
                          userId&$top=10;
                        3)/User?$expand=jobInfo$select=jobInfo/employment&$filter
                          =department eq 'IT Services'&$orderby=userId&$top=
                          1000&$skip=500.
                    "  }
            ],
            "itemScore": 61,
            "type": "Database"
        },
        {
            "actions": [
                ("recommendation 1":"Decrease query page size. Decrease $top
                    to $top=200."
            ],
            "itemScore": 71,
            "type": "IO"
        },
        {
            "actions": [
                ("recommendation 1":"Need to reduce the number of
                    properties/navigation properties of Entity:User. There are
                    5 navigation properties in one query: hr/userId,hr/
                    username,manager/userId,manager/username,jobInfo/
                    employment. Check if these are needed for integrations and
                    remove any that are not needed."
            ],
            "itemScore": 79,
            "type": "Entity"
        },
...
```

FIG. 3

PROTECTING CLOUD SYSTEMS USING REQUEST SCORES

BACKGROUND

Enterprises can use enterprise applications to support and execute operations. Enterprise applications can be deployed in cloud computing environments, which includes execution of the enterprise applications within a data center of a cloud-computing provider (e.g., as part of an infrastructure-as-a-service (IaaS) offering). Cloud computing can be described as Internet-based computing that provides shared computer processing resources, and data to computers and other devices on demand. Users can establish respective sessions, during which processing resources, and bandwidth are consumed. During a session, for example, a user is provided on-demand access to a shared pool of configurable computing resources (e.g., computer networks, servers, storage, applications, and services). In some instances, clients (e.g., client-side computing devices) transmit requests to a cloud computing environment, which requests are routed to a server for processing.

SUMMARY

Implementations of the present disclosure are directed to executing applications in cloud systems. More particularly, implementations of the present disclosure are directed to protecting cloud systems using request scores.

In some implementations, actions include receiving a request through a web services application programming interface (API), the request comprising a query to query a database system, retrieving a set of weights that is specific to the web services, determining a factor score for each impact factor in a set of impact factors to provide a set of factor scores, providing a score total for the query based on the set of weights and the set of factor scores, returning a score response including the total score and at least one query suggestion, and receiving a modified request through the web services API, the modified request including the query modified to include at least a portion of the at least one query suggestion. Other implementations of this aspect include corresponding systems, apparatus, and computer programs, configured to perform the actions of the methods, encoded on computer storage devices.

These and other implementations can each optionally include one or more of the following features: the score response is provided in response to the score response being less than a threshold score response; each weight in the set of weights is specific to an impact factor and is determined from historical data representing requests submitted through the web services API; the at least one query suggestion is specific to an impact factor and is automatically provided as a predefined suggestion that is specific to the impact factor in response to a factor score of the impact factor; the score response is returned with a query response including data that is retrieved from the database system and is responsive to the query; the score response is returned without a query response; weights in the set of weights are determined based on historical data that represents requests processed by the backend system in response to one or more calls to the web service API; and the historical data includes, for each call of the one or more calls, data representative of entity property count, select count, filter condition count, expand count, database call count, returned records, and resource usage.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 3 depicts an example score response in accordance with implementations of the present disclosure.

Like reference symbols in the various drawings indicate like elements.

DETAILED DESCRIPTION

Figure 1:
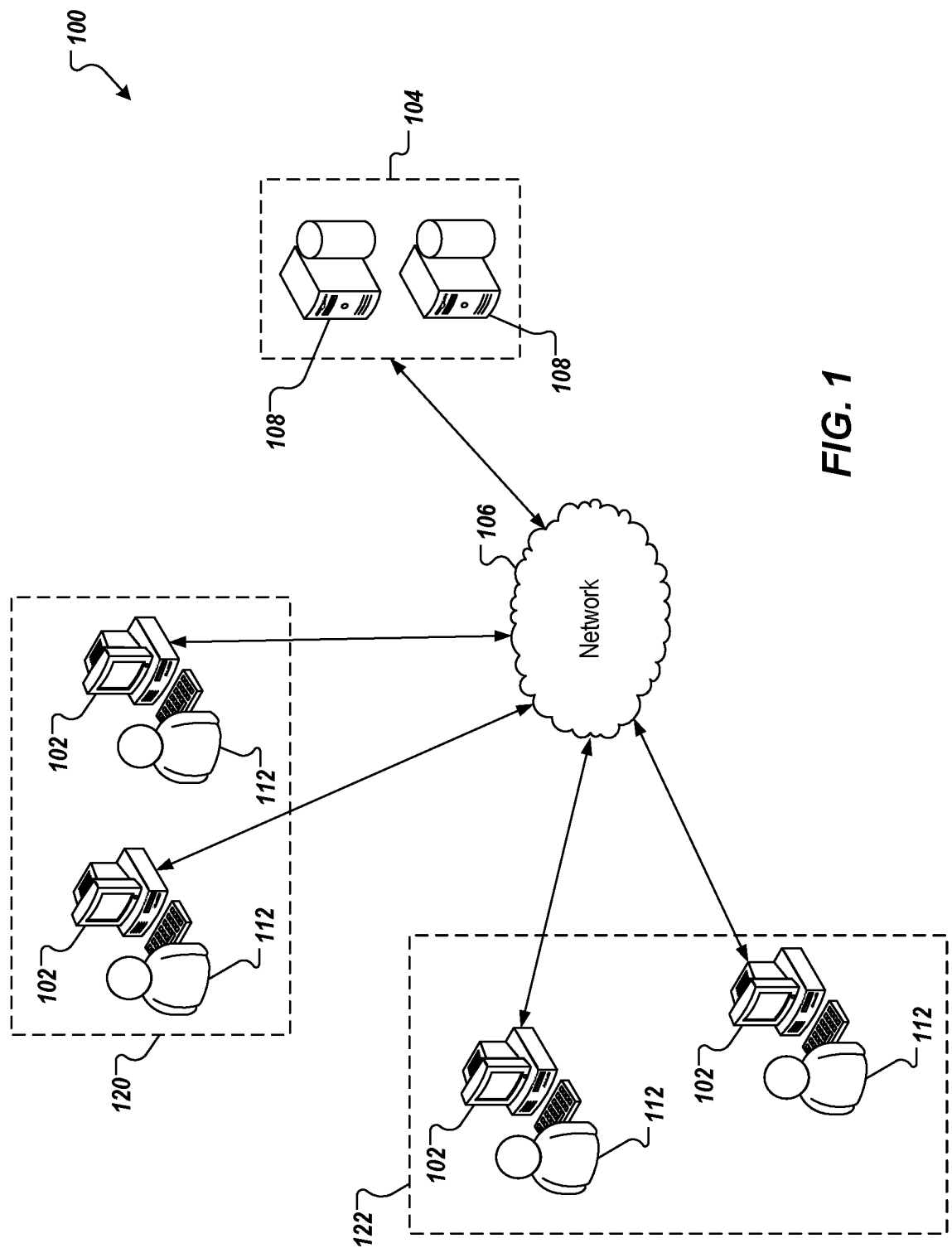
FIG. 1 depicts an example architecture that can be used to execute implementations of the present disclosure.

Implementations of the present disclosure are directed to executing applications in cloud systems. More particularly, implementations of the present disclosure are directed to protecting cloud systems using request scores. Implementations can include actions of receiving a request through a web services application programming interface (API), the request comprising a query to query a database system, retrieving a set of weights that is specific to the web services, determining a factor score for each impact factor in a set of impact factors to provide a set of factor scores, providing a score total for the query based on the set of weights and the set of factor scores, returning a score response including the total score and at least one query suggestion, and receiving a modified request through the web services API, the modified request including the query modified to include at least a portion of the at least one query suggestion.

To provide further context for implementations of the present disclosure, and as introduced above, enterprises can use enterprise applications to support and execute operations. Enterprise applications can be deployed in cloud computing environments, which includes execution of the enterprise applications within a data center of a cloud-computing provider (e.g., as part of an infrastructure-as-a-service (IaaS) offering). Cloud computing can be described as Internet-based computing that provides shared computer processing resources, and data to computers and other devices on demand. Users can establish respective sessions, during which processing resources, and bandwidth are consumed. During a session, for example, a user is provided on-demand access to a shared pool of configurable computing resources (e.g., computer networks, servers, storage, applications, and services). In some instances, clients (e.g., client-side computing devices) transmit requests to a cloud computing environment, which requests are routed to a server for processing.

In cloud systems, functions can be exposed as web services. For example, a cloud-based application can make calls to one or more web services through an application programming interface (API), which can be referred to as a web services API, the web services executing functionality requested by the application. In some examples, applications can call web service for internal integrations for internal module teams and/or external integration for end customer systems. For example, and without limitation, user interface (UI) pages and/or mobile applications can call a web services API to build customer facing pages. As another example, customers may have their own internal systems and call the web services API for data integration and/or secondary development.

As applications are increasingly moved to cloud systems, more and more web services API entities and functionalities are exposed. For example, a cloud system can have hundreds to thousands, if not more, of API entities and functions for internal and external customers. In many instances, the entities and functions are not insular, and can have multiple navigation properties that can be expanded to other entities. However, customers may not know the backend logic and how their queries impact backend servers. Consequently, customer applications can query web services for as much data as possible in a single query with many deeply selected fields and deep expansion from one entity to other entities without considering the efficiency and/or performance. These kinds of usage can result in significantly large loads on backend servers in terms of computing resources demanded. These loads can also result in reduced quality of user experiences, as response times can take longer.

For example, an employee resource database can be used for employee basic information integration, which may contain one or more properties. Example properties can include, without limitation, images, attachments, and the like. While users that are querying the employee resource databases do not require such properties, queries submitted in an API request may still fetch the properties along with the basic information that is actually the target of the request. This results in wasted resources (e.g., needlessly expended processing, memory) and degraded performance (e.g., longer response times).

In view of the above context, implementations of the present disclosure are directed to a request system that protects cloud systems using request scores. More particularly, implementations of the present disclosure provide for a request system that provides intelligent calculation of request scores for internal customers (e.g., UI developers that build UI pages based on API requests, entity developers that build entities) and external customers (e.g., developers are customers that build customer integrations and processes based on web services APIs). In some implementations, the request system provides suggestions to optimize usage of web services. For example, if a request score of a query is too low (e.g., at or below a threshold request score), it can be determined that the query should be optimized to reduce load on backend resources and to improve performance (e.g., query response times). Customers can receive suggestions for how to optimize the query for future querying. In this manner, implementations of the present disclosure can avoid deteriorated performance of web services API calls, which not only protects backend servers, but also improves user experience.

FIG. 1 depicts an example architecture 100 in accordance with implementations of the present disclosure. In the depicted example, the example architecture 100 includes client devices 102, a network 106, and a server system 104. The server system 104 includes one or more server devices and databases 108 (e.g., processors, memory). In the depicted example, users 112 interact with the client devices 102. In the example of FIG. 1, a set of users 112 and respective client devices 102 can be associated with a first tenant 120 and a set of users 112 and respective client devices 102 can be associated with a second tenant 122.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes one or more servers 108. In the example of FIG. 1, the server system 104 is intended to represent various forms of servers including, but not limited to a web server, an application server, a proxy server, a network server, and/or a server pool. In general, server systems accept requests for services and provides such services to any number of client devices (e.g., the client device 102 over the network 106).

In some implementations, the server system 104 can embody a cloud computing environment, in which one or more of the servers 108 are application servers that receive queries, process the queries, and provide responses. For example, a web service hosed on a server 108 can receive a query from the client device 102. In accordance with implementations of the present disclosure, and as described in further detail herein, a query can be scored to provide a score that represents a load that the query places on the web service and a score response can be provided with a query response. In some examples, the score response indicates one or more scores determined for the query. In some examples, a query suggestion is provided to encourage more resource-efficient querying.

Figure 2:
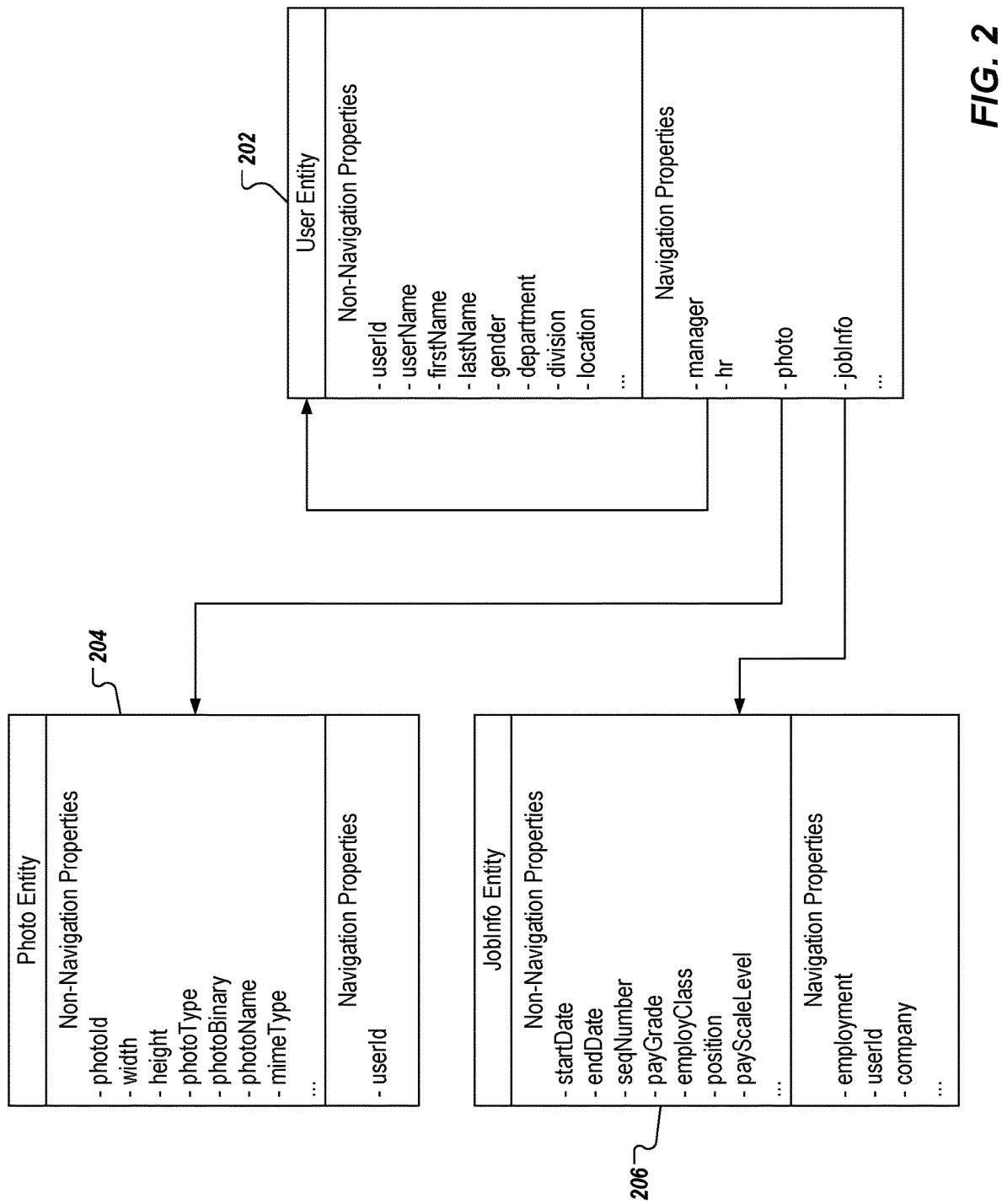
FIG. 2 depicts example entities and relationships therebetween to illustrate implementations of the present disclosure.

FIG. 2 depicts example entities and relationships therebetween to illustrate implementations of the present disclosure. In some examples, each entity represents a data structure that stores data as a set of properties that are descriptive of the respective entity. In some examples, a query can be submitted through a web service API to query the data. In the example of FIG. 2, the example entities include a user entity 202, a photo entity 204, and a job information entity 206. For example, the example entities can be provided for a human capital management (HCM) system, where the user entity 202 can represent a person (e.g., employee, agent) of an enterprise, the photo entity 204 represents an image of the person, and the job information entity 206 represents the job that the person has with the enterprise. In some examples, entities include non-navigation properties and navigation properties. In some examples, non-navigation properties include properties that can be displayed in a UI. In some examples, navigation properties include properties that can be displayed in a UI and can be selected to navigate to another UI.

For example, and with non-limiting reference to the example entities of FIG. 2, properties of a person can be displayed in a UI and include non-navigation properties and navigation properties based on the user entity 202. In some examples, a user that is viewing the UI can select a navigation property to display another entity in the UI. For example, the user can select a "photo" property and, in response, an image of the person represented by the user entity 202 can be displayed in a UI based on the photo entity 204. As another example, the user can select a "jobInfo" property and, in response, job information for the person represented by the user entity 202 can be displayed in a UI based on the job information entity 206.

In some examples, a query that is submitted through a web services API can be composed of several components. Example components can include, without limitation, entities, select fields, deep expand, filter, and page size. By way of non-limiting example, and with reference to the example entities of FIG. 2, an example query can be provided as:

```
/User?$expand=hr,manager,jobInfo&$select=userId,username,hr/us
erId,hr/username,manager/userId,manager/username,jobInfo/emplo
yment&$filter=department eq 'IT Services'&$orderby=userId&$top
=1000&$skip=500
```

The example query includes a deep expand to user manager and job info. Consequently, the web service that processes the query must execute several database calls in the backend and there may be join operations (e.g., SQL join operations), joined tables, set operations (e.g., union, intersect, except) for each database call. As a result, this single query can impart a relatively high load on the web service and backend interactions in terms of time and resources expended to provide a query response.

In view of this, and as introduced above, implementations of the present disclosure selectively score queriers to provide, for each query, a score that represents a complexity of the query in terms of a load that the query imparts on the web service and backend. In some examples, the query is executed to provide a query response and the score and/or constituent scores are provided in a score response that can be provided with the query response. In some examples, the query is not executed and, instead, the score response is provided.

In scoring queries, implementations of the present disclosure account for multiple impact factors, each impact factor having an associated weight. In some examples, each weight is configurable, and the sum of the weights is equal to 1. If a weight is configured as 0, it means the respective impact factor is ignored from consideration in scoring. Table 1 provides details on example impact factors considered in scoring queries:

TABLE 1

Example impact Factors for Scoring

| Impact Factor | Weight | Description |
| --- | --- | --- |
| entity definition | $w_1$ | Backend entities vary, some are complicated with many fields and navigations to other entities, some are very simple and isolated. Queries against different entities have different base complexity. |
| select fields | $w_2$ | Query syntax related to select fields. |
| deep expand | $w_3$ | Query syntax - related to navigation size and depth from one entity to other entities (e.g., user expands to user manager to job info). |
| filter | $w_4$ | Query syntax - related to filter fields (e.g., filter condition size, depth of nested filter condition). |
| database calls | $w_5$ | Database call count of one internal/external request. |
| database SQLs | $w_6$ | Representative of each db sql complexity, SQL join operations, joined tables, set operations (union, intersect, except). |
| IO and Response records (e.g., page size, top, skip, IO between application and backend) | $w_7$ | Data between application and database and records in response. |

In some implementations, a score is provided for each impact factor and can be referred to as factor scores. Example factor scores are provided in Table 2:

TABLE 2

Example Factor Scores

| Impact Factor | Factor Score |
| --- | --- |
| Entity | SCORE_ENTITY |
| Select | SCORE_SELECT |
| Filter | SCORE_FILTER |
| Expand | SCORE_EXPAND |
| Database Calls | SCORE_DB_CALL |
| Database | SCORE_DATABASE |
| IO | SCORE_IO |

As described in further detail herein, the factor scores are combined to provide a total score (SCORE_TOTAL) for a query.

In some implementations, historical data representative of API requests can be stored in performance logs. For example, for each API request (e.g., query submitted through a web services API) and query response, data representative of entity property count, select count, filter condition count, expand count, database call count, returned records, and resource usage (e.g., CPU (cpuTime), memory (memoryCost), response time (response Time)) is recorded in the performance logs. For each API, weights (e.g., $w_1, \ldots, w_7$) are determined based on the historical data recorded for the respective API. In some examples, linear regression is used to calculate the weights from the historical data.

More particularly, a set of the vectors $[a_1, a_2, a_3, a_4, a_5, a_6, a_7]$, $[b_1, b_2, b_3, b_4, b_5, b_3, b_7]$, $[c_1, c_2, c_3, c_4, c_5, c_6, c_7]$ as the impact factors for cpuTime, memoryCost, response Time. Here, the following relationships are provided:

$$a_1 + a_2 + a_3 + a_4 + a_5 + a_6 + a_7 = 1 \quad (1)$$

$$b_1 + b_2 + b_3 + b_4 + b_5 + b_6 + b_7 = 1 \quad (2)$$

$$c_1 + c_2 + c_3 + c_4 + c_5 + c_6 + c_7 = 1 \quad (3)$$

$$(4)$$

$$a_1 \times \text{SCORE\_ENTITY} + a_2 \times \text{SCORE\_SELECT} + a_3 \times \text{SCORE\_FILTER} +$$
$$a_4 \times \text{SCORE\_EXPAND} + a_5 \times \text{SCORE\_DB\_CALL} +$$
$$a_6 \times \text{SCORE\_DATABASE} + a_7 \times \text{SCORE\_IO} = A_1 \times cpuTime + A_0$$
$$(5)$$

$$b_1 \times \text{SCORE\_ENTITY} + b_2 \times \text{SCORE\_SELECT} + b_3 \times \text{SCORE\_FILTER} +$$
$$b_4 \times \text{SCORE\_EXPAND} + b_5 \times \text{SCORE\_DB\_CALL} +$$
$$b_6 \times \text{SCORE\_DATABASE} + b_7 \times \text{SCORE\_IO} = B_1 \times memory + B_0$$
$$(6)$$

$$c_1 \times \text{SCORE\_ENTITY} + c_2 \times \text{SCORE\_SELECT} + c_3 \times \text{SCORE\_FILTER} +$$
$$c_4 \times \text{SCORE\_EXPAND} + c_5 \times \text{SCORE\_DB\_CALL} +$$
$$c_6 \times \text{SCORE\_DATABASE} + c_7 \times \text{SCORE\_IO} = C_1 \times responseTime + C_0$$

where $A_1, A_0, B_1, B_0, C_1, C_0$ are constants, $A_1, B_1, C_1 < 0$, and $A_0, B_0, C_0 > 0$. Here, $A_0, B_0, C_0$ are constants provided as positive values. This ensures that none of the factor scores, and thus the total score, can be equal to zero. Also, $A_1, B_1, C_1$ are constants provided as negative values. This is due to the fact that, in Equations (4)-(6), the greater each of the factor scores is, the less the cpuTime, memory, and responseTime are.

In some implementations, performance logs are used to calculate values of the vectors $[a_1, a_2, a_3, a_4, a_5, a_6, a_7]$, $[b_1, b_2, b_3, b_4, b_5, b_3, b_7]$, and $[c_1, c_2, c_3, c_4, c_5, c_6, c_7]$ and the constants $A_1, B_1, C_1, A_0, B_0, C_0$. From Equations (4), (5), and (6), the following example relationship is provided:

$$\frac{a_1 + b_1 + c_1}{3} \times \text{SCORE\_ENTITY} + \frac{a_2 + b_2 + c_2}{3} \times \text{SCORE\_SELECT} + \quad (7)$$
$$\frac{a_3 + b_3 + c_3}{3} \times \text{SCORE\_FILTER} + \frac{a_4 + b_4 + c_4}{3} \times \text{SCORE\_EXPAND} +$$
$$\frac{a_5 + b_5 + c_5}{3} \times \text{SCORE\_DB\_CALL} +$$
$$\frac{a_6 + b_6 + c_6}{3} \times \text{SCORE\_DATABASE} + \frac{a_7 + b_7 + c_7}{3} \times \text{SCORE\_IO} =$$
$$\frac{1}{3}(A_1 + cpuTime + A_0 + B_1 \times memory + B_0 + C_1 \times responseTime + C_0)$$

Further, a weight vector $[w_1, w_2, w_3, w_4, w_5, w_6, w_7]$ can be provided using the following example relationship:

$$w_i = \frac{(a_i + b_i + c_i)}{3}; \quad (8)$$

$$(1 \le i \le 7)$$

As noted above, $w_1+w_2+w_3+w_4+w_5+w_6+w==_1$. Equation (8) can be used with Equation (7) to provide:

$$w_1 \times \text{SCORE\_ENTITY} + \quad (9)$$
$$w_2 \times \text{SCORE\_SELECT} + w_3 \times \text{SCORE\_FILTER} +$$
$$w_4 \times \text{SCORE\_EXPAND} + w_5 \times \text{SCORE\_DB\_CALL} +$$
$$w_6 \times \text{SCORE\_DATABASE} + w_7 \times \text{SCORE\_IO} =$$
$$\frac{1}{3}(A_1 + cpuTime + A_0 + B_1 \times memory + B_0 + C_1 \times responseTime + C_0)$$

In some examples, the SCORE_TOTAL can be provided by the following example relationship:

$$\text{SCORE\_TOTAL} = \quad (10)$$
$$\frac{1}{3}(A_1 + cpuTime + A_0 + B_1 \times memory + B_0 + C_1 \times responseTime + C_0)$$

By putting Equation (10) into Equation (9), the SCORE_TOTAL can be provided by the following example relationship:

$$\text{SCORE\_TOTAL} = w_1 \times \text{SCORE\_ENTITY} + \quad (11)$$
$$w_2 \times \text{SCORE\_SELECT} + w_3 \times \text{SCORE\_FILTER} +$$
$$w_4 \times \text{SCORE\_EXPAND} + w_5 \times \text{SCORE\_DB\_CALL} +$$
$$w_6 \times \text{SCORE\_DATABASE} + w_7 \times \text{SCORE\_IO}$$

The higher the SCORE_TOTAL is, the better the request (query) is in terms of load on the backend and response time.

In some implementations, SCORE_ENTITY is determined based on the following example pseudo-code:

Listing 1: SCORE_ENTITY Determination

```
//Entity Score
//For example, each entity should have no more than 1000
//non-navigation properties or 250 navigation properties,
//1 navigation property complexity = 4 non-navigation property
//complexity, then CONFIGURED_MAXIMUM_NON_NAVIGATION
//PROPERTY_COUNT = 1000 and
//CONFIGURED_MAXIMUM_NAVIGATION_PROPERTY_COUNT = 250
SCORE_ENTITY MAX (0, AVG (100 - 0.1*NON_NAVIGATION_PROPERTY_COUNT -
0.4*NAVIGATION_PROPERTY_COUNT))
```

In some implementations, SCORE_SELECT is determined based on the following example pseudo-code:

Listing 2: SCORE_SELECT Determination

```
//Select Score
//For example, 50 selected fields in one query, then
//CONFIGURED_MAXIMUM_SELECT_COUNT = 50
SCORE_SELECT = MAX (0, (100 − 2*SELECT_COUNT))
```

In some implementations, SCORE_FILTER is determined based on the following example pseudo-code:

Listing 3: SCORE_FILTER Determination

```
//Filter Score
//For example, 20 OR and AND operators in one query, then
//CONFIGURED_MAXIMUM_OR_COUNT + CONFIGURED_MAXIMUM_AND_COUNT = 20
SCORE FITER MAX (0, (100 − 5* (OR_COUNT + AND COUNT)))
```

In some implementations, SCORE_EXPAND is determined based on the following example pseudo-code:

Listing 4: SCORE_EXPAND Determination

```
//Expand Score
//For example, 10 deep expand in one query, then
//CONFIGURED_MAXIMUM_EXPAND_COUNT = 10
SCORE_EXPAND= MAX (0, (100 − 10*EXPAND_COUNT))
```

In some implementations, SCORE_DB_CALL is determined based on the following example pseudo-code:

Listing 5: SCORE_DB_CALL Determination

```
//Database Call Score
//For example, DB call count to be less than 8, then
//CONFIGURED_MAXIMUM_ DB_ CALL_COUNT = 8
SCORE DATABASE CALL= MAX( O, 100 − DB_CALL_COUNT* 100 / 8 )
```

In some implementations, SCORE_DATABASE is determined based on the following example pseudo-code:

Listing 6: SCORE_DATABASE Determination

```
//SQL Score
//For example, support:
//10 join operations, 20 joint columns, 2 union operations and
//2 calculation engine plans, 6 row execution engine plans and
//preferred table size is less 10000 rows
//W61 + W62 + W63 + W64 + W65 + W66 = 0.2 + 0.3 + 0.15 + 0.1 +
//0.2 + 0 . 05 = 1
FOR EACH DB CALL
   JOIN_SCORE = MAX(0, 100 − JOIN_OPERATION COUNT*10)*0.2 +
   MAX (0, 100 − JOIN_COUNT*5 )*0.3
   SET_SCORE = MAX(0, 100 − UNION_OPERATION_COUNT*50)*0.15
   CALC_SCORE = MAX(0, 100 − CALC_EXEC_ENGINE_COUNT*50)*0.1
   ROW_SCORE = MAX(0, 100 − ROW_EXEC_ENGINE_COUNT*100/6)*0.2
   TATBLE_SCORE = MAX(0, 100 − ALL_TABLE_SIZE*0.01)*0.05
   SQL_SCORE = JOIN_SCORE + SET_SCORE + CALC_SCORE + ROW_SCORE
   + TATBLE_SCORE
}
//Database Score is the min value of all SQL scores
SCORE_DATABASE = MIN(SQL_SCORE);
```

In some implementations, SCORE_IO is determined based on the following example pseudo-code:

Listing 7: SCORE_IO Determination

```
//IO Score
//For example, all output rows to be less than 2000, then
//CONFIGURED_MAXIMUM_ALL_OUT_PUT = 2000
//if there is only one DB call, output rows should be the small
//value between all output rows and one page size count value
ALL_OUT_PUT = SUM(OUT_PUT_ROWS);
IF( DB_CALL_COUNT == 1 ) {
   ALL_OUT_PUT = MIN(ALL_OUT_PUT, PAGE_SIZE)
```

-continued

Listing 7: SCORE_IO Determination

```
}
SCORE_IO = MAX(0, 100 − ALL_OUT_PUT / 20)
```

In some implementations, values for the vectors $[a_1, a_2, a_3, a_4, a_5, a_6, a_7]$, $[b_1, b_2, b_3, b_1, b_5, b_3, b_7]$, and $[c_1, c_2, c_3, c_4, c_5, c_6, c_7]$ and the constants $A_1, B_1, C_1, A_0, B_0, C_0$ can be determined by applying, for example, linear regression to the historical data of the performance logs. For example, From Equations (4), (5), and (6), the following example relationships can be provided:

$$-\frac{A_0}{A_1} + \frac{a_1}{A_1}\text{SCORE\_ENTITY} + \frac{a_2}{A_1}\text{SCORE\_SELECT} + \qquad (12)$$
$$\frac{a_3}{A_1}\text{SCORE\_FILTER} + \frac{a_4}{A_1}\text{SCORE\_EXPAND} + \frac{a_5}{A_1}\text{SCORE\_DB\_CALL} +$$
$$\frac{a_6}{A_1}\text{SCORE\_DATABASE} + \frac{a_7}{A_1}\text{SCORE\_IO} = cpuTime$$

$$-\frac{B_0}{B_1} + \frac{b_1}{B_1}\text{SCORE\_ENTITY} + \frac{b_2}{B_1}\text{SCORE\_SELECT} + \qquad (13)$$
$$\frac{b_3}{B_1}\text{SCORE\_FILTER} + \frac{b_4}{B_1}\text{SCORE\_EXPAND} + \frac{b_5}{B_1}\text{SCORE\_DB\_CALL} +$$
$$\frac{b_6}{B_1}\text{SCORE\_DATABASE} + \frac{b_7}{B_1}\text{SCORE\_IO} = memory$$

$$-\frac{C_0}{C_1} + \frac{c_1}{C_1}\text{SCORE\_ENTITY} + \frac{c_2}{C_1}\text{SCORE\_SELECT} + \qquad (14)$$
$$\frac{c_3}{C_1}\text{SCORE\_FILTER} + \frac{c_4}{C_1}\text{SCORE\_EXPAND} + \frac{c_5}{C_1}\text{SCORE\_DB\_CALL} +$$
$$\frac{c_6}{C_1}\text{SCORE\_DATABASE} + \frac{c_7}{C_1}\text{SCORE\_IO} = responseTime$$

Further, the following vector and relationships can be defined:

$$x = \qquad (15)$$
$$[1, \text{SCORE}_{ENTITY}, \text{SCORE}_{SELECT}, \text{CORE}_{FILTER}, \text{SCORE\_EXPAND}, \text{CORE\_DB\_CALL}, \text{SCORE\_DATABASE}, \text{SCORE\_IO}]^T$$

$$a' = \left[-\frac{A_0}{A_1}, \frac{a_1}{A_1}, \frac{a_2}{A_1}, \frac{a_3}{A_1}, \frac{a_4}{A_1}, \frac{a_5}{A_1}, \frac{a_6}{A_1}, \frac{a_7}{A_1}\right] \qquad (16)$$

$$b' = \left[-\frac{B_0}{B_1}, \frac{b_1}{B_1}, \frac{b_2}{B_1}, \frac{b_3}{B_1}, \frac{b_4}{B_1}, \frac{b_5}{B_1}, \frac{b_6}{B_1}, \frac{b_7}{B_1}\right] \qquad (17)$$

$$c' = \left[-\frac{C_0}{C_1}, \frac{c_1}{C_1}, \frac{c_2}{C_1}, \frac{c_3}{C_1}, \frac{c_4}{C_1}, \frac{c_5}{C_1}, \frac{c_6}{C_1}, \frac{c_7}{C_1}\right] \qquad (18)$$

From the above relationships, the following can be provided:

$$a'x = cpuTime \qquad (19)$$
$$b'x = memory \qquad (20)$$
$$c'x = responseTime \qquad (21)$$

In applying linear regression, it can be provided that there are m sample records in the performance logs. Accordingly, the following relationships can be provided:

(SCORE$_{ENTITY}^{(1)}$,SCORE$_{SELECT}^{(1)}$,SCORE$_{FILTER}^{(1)}$,SCORE$_{EXPAND}^{(1)}$,SCORE$_{DBCALL}^{(1)}$, SCORE_DATABASE$^{(1)}$,SCORE_IO$^{(1)}$,cpuTime$^{(1)}$, memory$^{(1)}$,responseTime$^{(1)}$)
(SCORE$_{ENTITY}^{(2)}$,SCORE$_{SELECT}^{(2)}$,SCORE$_{FILTER}^{(2)}$,SCORE$_{EXPAND}^{(2)}$, SCORE_DB_CALL$^{(2)}$,SCORE_DATABASE$^{(2)}$,SCORE_IO$^{(2)}$,cpuTime$^{(2)}$, memory$^{(2)}$,responseTime$^{(2)}$)
...
(SCORE$_{ENTITY}^{(m)}$,SCORE$_{SELECT}^{(m)}$,SCORE$_{FILTER}^{(m)}$,SCORE$_{EXPAND}^{(m)}$,SCORE$_{DBCALL}^{(m)}$, SCORE_DATABASE$^{(m)}$,SCORE_IO$^{(m)}$,cpuTime$^{(m)}$, memory$^{(m)}$,responseTime$^{(m)}$)

The following example matrix can be provided from the are m sample records of the performance logs:

$$X = \begin{bmatrix} 1 & \text{SCORE\_ENTITY}^{(1)} & \text{SCORE\_FILTER}^{(1)} & \cdots & \text{SCORE\_IO}^{(1)} \\ \vdots & \vdots & \vdots & \ddots & \vdots \\ 1 & \text{SCORE\_ENTITY}^{(m)} & \text{SCORE\_FILTER}^{(m)} & \cdots & \text{SCORE\_IO}^{(m)} \end{bmatrix}$$

such that $$X = \begin{bmatrix} x^{(1)} \\ x^{(2)} \\ \ldots \\ x^{(m)} \end{bmatrix}$$

The following vectors can be defined from the sample records:

$$y_{cpu} = \left[ cpuTime^{(1)}, cpuTime^{(2)}, \ldots, cpuTime^{(m)} \right]^T$$
$$y_{mem} = \left[ memory^{(1)}, memory^{(2)}, \ldots, memory^{(m)} \right]^T$$
$$y_{resp} = \left[ responseTime^{(1)}, responseTime^{(2)}, \ldots, responseTime^{(m)} \right]^T$$

Then a', b', c' can be calculated from m sample records of performance logs by ordinary least square:

$$a' = \left((X^T X)^{-1} X^T y_{cpu}\right)^T \qquad (22)$$
$$b' = \left((X^T X)^{-1} X^T y_{mem}\right)^T \qquad (23)$$
$$c' = \left((X^T X)^{-1} X^T y_{resp}\right)^T \qquad (24)$$

Together with Equations (1), (2), (3), values for the vectors $[a_1, a_2, a_3, a_4, a_5, a_6, a_7]$, $[b_1, b_2, b_3, b_4, b_5, b_3, b_7]$, and $[c_1, c_2, c_3, c_4, c_5, c_6, c_7]$ and the constants $A_1, B_1, C_1, A_0, B_0, C_0$ can be determined.

As introduced above, a score response can be returned with a query response. In some examples, the score response can be returned in response to a user request for the score response. In some examples, if the SCORE_TOTAL is below a threshold score, the score response is returned. In some examples, the query is executed to provide a query response and the score response is provided with the query response. In this manner, the query response is received regardless, and the user is informed on improving the query in a subsequent request. In some examples, the query is not executed and, instead, the score response is returned. In this manner, processing of a computationally inefficient query is avoided, and the user can improve the query for resubmission.

As discussed above, one or more query suggestions can be provided to encourage rewriting of subsequent queries to decrease load and improve performance. In some examples, query suggestions are automatically generated based on the total score, factor scores of the respective impact factors, and API query analysis. For different factors, different suggestions will be automatically provided according to the request patterns, backend data, and calculated scores. There are multiple types of suggestions, which include engineering suggestions and user suggestions. Some suggestions are general and predefined, and some are specific based on the query composed, backend entity design, and database tables involved. For each factor, there are multiple recommendations, one general recommendation (sometimes predefined) and one specific recommendation. For example, if too many SQL joins generated for one query are detected, there will be suggestions for the engineering side to review the design of the API entity and decrease the SQL joins. As another example, if there are too many selected fields and select score is high, there will be suggestions for the user side to reduce the fields in select and will also provide a suggestion of how to split the query into different queries with less selected fields but can also fulfill the requirement.

Continuing, and by way of non-limiting example, an example API filtering condition can be considered and can be provided as:

$filter=userId eq 'admin' OR (userId ne 'admin' AND username eq 'admin')

The following example filtering condition can be provided as a query suggestion:

$filter=userId eq 'admin' OR username eq 'admin'

Accordingly, the original filter condition can be replaced by the suggested filter condition in a subsequent query to reduce resource consumption and performance.

FIG. 3 depicts a portion of an example score response 300 in accordance with implementations of the present disclosure. The portion of the example score response 300 corresponds to the example query introduced above with reference to FIG. 2. As depicted in FIG. 3, query suggestions are provided as recommendations for select impact factors. In some examples, each query suggestion is provided from a template query suggestion. In some examples, if a respective factor score is below a respective threshold factor score, the template query suggestion is populated with relevant portions of the original query included in the score response.

In further detail, for each factor, there are various recommendations that can be provided. Some recommendations are general guideline suggestions and some recommendations detail optimization of queries, for example. Table 3 provides an example summary of recommendations and how each can be generated:

TABLE 3

Example Impact Factor Recommendations

| Factors | Recommendations | Description | How generated |
|---|---|---|---|
| Database Score | Recommendation 1 | For engineering side, decrease joins in SQL. Review the design of each API entity, downgrade the SQL joins for one single entity. | This is a general suggestion predefined once the entity definition score is high. |
| | Recommendation 2 | For client side, if there are multiple expand properties or deep level expand, reduce the expand properties number and expand depth:<br>1) Suggested sub query 1<br>2) Suggested sub query2 . . . | First part is general description and second part is specific and suggested sub queries are generated based on the specific query and backend DB tables involved in the Entity design, and split the queries to reduce SQL joins. |
| IO Score | Recommendation 1 | Decrease query page size. Decrease $top, say $top = XXX. | This is a general suggestion predefined except the $top number. If IO score is high, it's easy to decrease the page size to reduce IO for each request and use pagination to get all records. |
| Entity Score | Recommendation 1 | Need reduce the number of properties/navigation properties of Entity: <EntityName>. There are XXX navigation properties in one query: navigationProperty1, navigationProperty2, . . . Check if there are needed for integrations and remove ones that are not needed. | This is a general suggestion and the template is predefined. |
| Select Score | Recommendation 1 | need reduce the number of $select fields | This is a general suggestion predefined. |
| | Recommendation 2 | Split the request to multiple ones: | Split the request to multiple ones with less |

TABLE 3-continued

Example Impact Factor Recommendations

| Factors | Recommendations | Description | How generated |
|---|---|---|---|
| | | 1) Suggested sub query 1<br>2) Suggested sub query 2 . . . | select fields. The principle is query all data part by part. |
| Expand Score | Recommendation 1 | need reduce the number of $expand fields | This is a general suggestion predefined. |
| | Recommendation 2 | Split the request to multiple ones:<br>1) Suggested sub query 1<br>2) Suggested sub query 2 . . . | Split the request to multiple ones with less expand fields. The principle is query all data step by step. First step is to query basic data. After steps are to query deeper data and use basic data as filter. |
| Filter Score | Recommendation 1 | need reduce the number/depth of $filter fields | This is a general suggestion predefined. |
| | Recommendation 2 | Split the request to multiple ones:<br>1) Suggested sub query 1<br>2) Suggested sub query 2 . . . | Split the request to multiple ones with less filter fields. For one level filter like "username eq xxx and userId ne xxx", no need to rewrite it since DB will to optimization. For deep level filter like "manager/username eq xxx", split the request to query manager business key with "username eq xxx", then use manager business key to do next query. |
| Database Call Score | Recommendation 1 | need reduce the number of database calls for this query. | This is a general suggestion predefined for Engineering side. |

Figure 4:
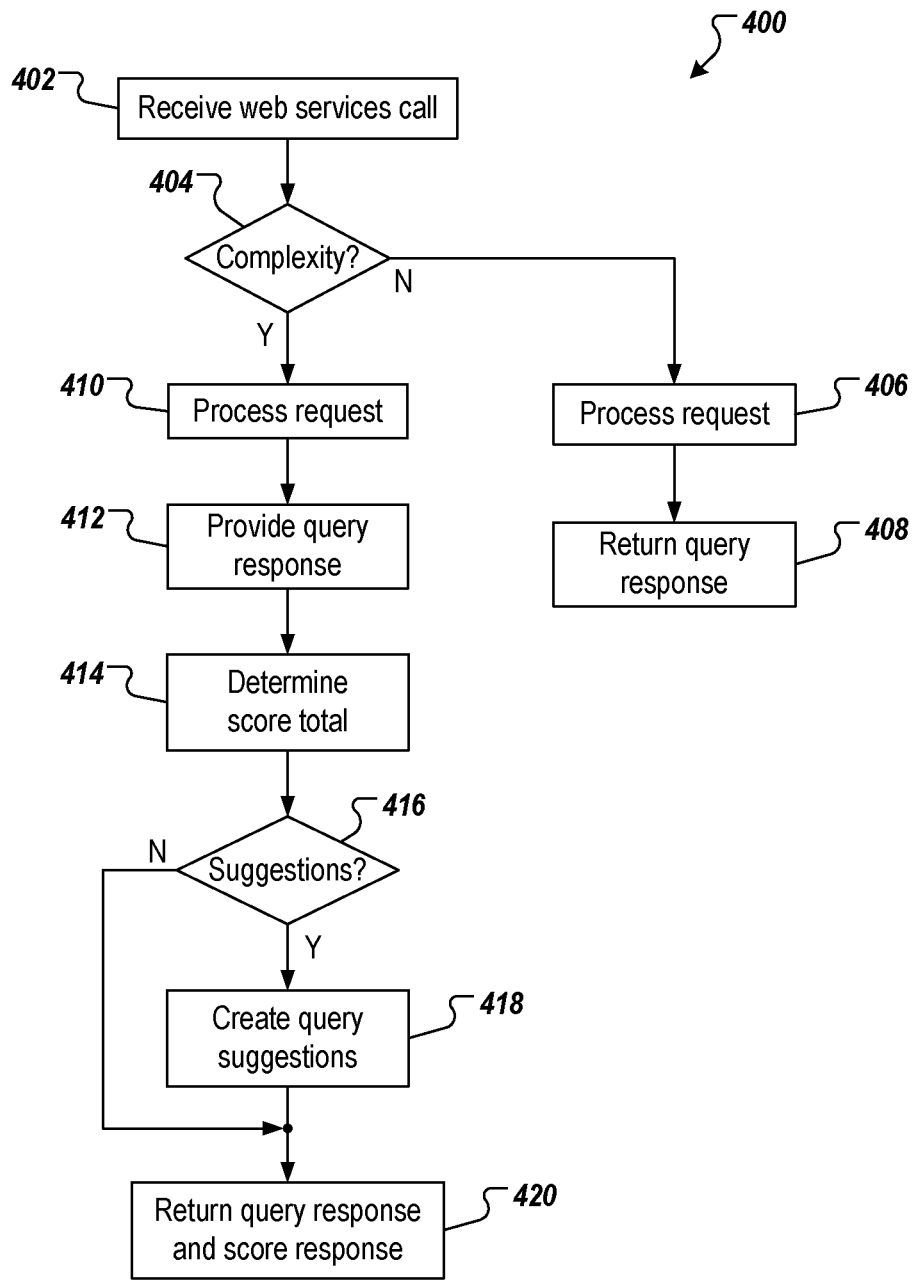
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices.

A web services call is received (402). For example, a client can issue a request to a web service through a web services API, the request including a query for querying a database. It is determined whether a complexity of the query is to be evaluated for scoring and query suggestions (404). For example, the client that submitted the request can include an indicator to indicate whether the complexity of the query is to be evaluated. If the complexity of the query is not to be evaluated, the request is processed by a backend (406) and a query response is returned (408). For example, the request is processed by the database being queried using the query and data the is responsive to the query being returned from the database. In some examples, one or more operations are performed on the data. The query response is provided by the backend system and includes at least a portion of the data and/or at least a portion of results of the one or more operations.

If the complexity of the query is to be evaluated, the request is processed by a backend (410) and a query response is provided (412) as discussed above. A score total is determined for the query (414). For example, and as described herein, a set of weights that is specific to the API that the request was received from is retrieved (e.g., from computer-readable memory). Factor scores are determined for each impact factor in view of the query, and the factor scores are combined based on the set of weights to provide the score total, as described herein.

It is determined whether one or more query suggestions are to be provided (416). For example, and as described herein, each factor score can be compared to a respective threshold factor score. If the factor score does not exceed the respective threshold factor score, it is determined that a query suggestion is to be provided for the impact factor. If the factor score meets or exceeds the respective threshold factor score, it is determined that a query suggestion is not to be provided for the impact factor. If a query suggestion is to be provided for any impact factors, the query suggestion(s) is/are created (418). The query response and score response are returned (420).

Figure 5:
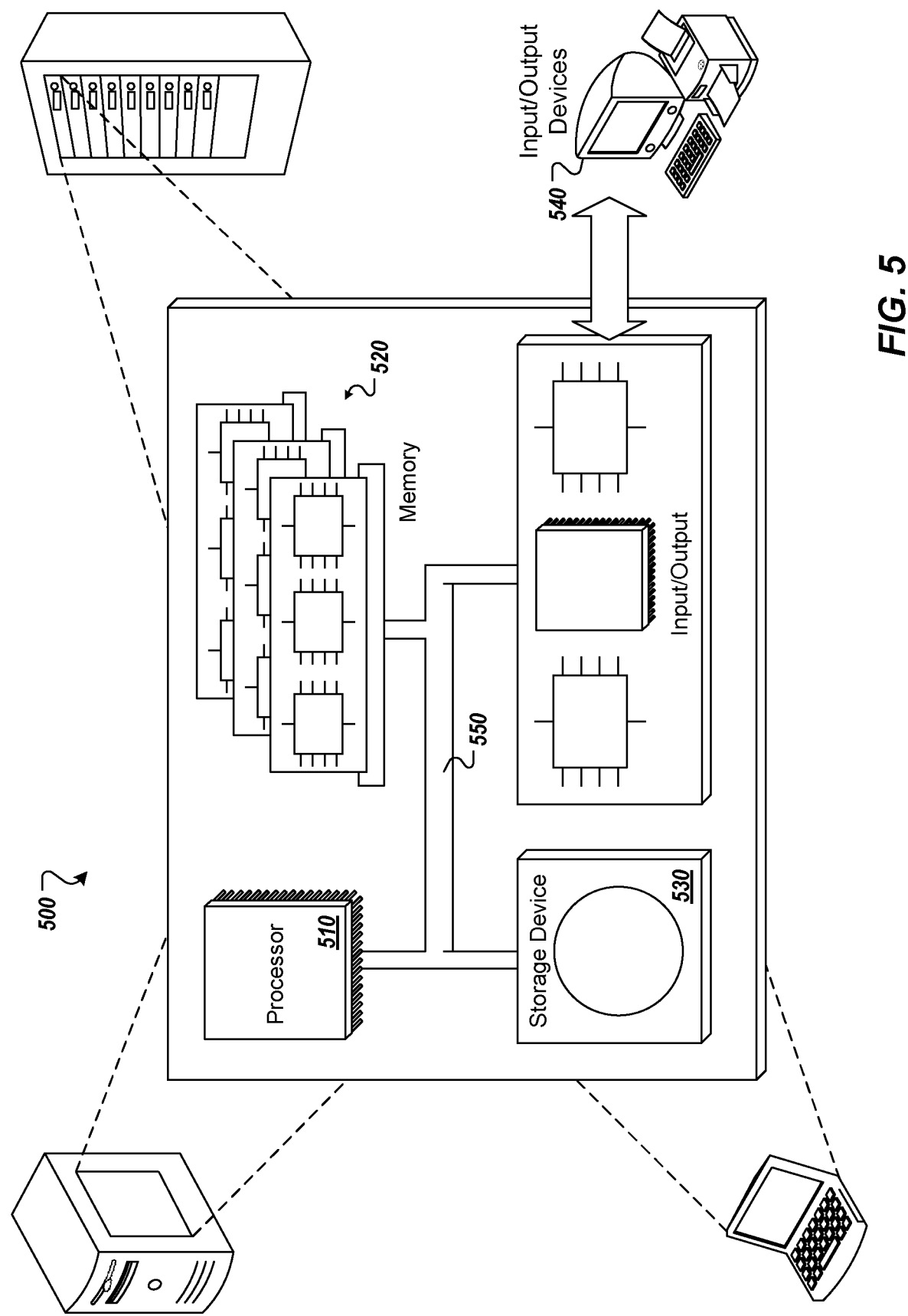
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a backend component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for evaluating queries received through web service application programming interfaces (APIs) to improve query processing and performance of backend systems, the method being executed by one or more processors and comprising:
  receiving a first request through a web services API, the first request comprising a first query to query a database system;
  executing the first query to generate a first response;
  retrieving a set of weights that is specific to the web services API that the first request is received through;
  determining a factor score for each impact factor in a set of impact factors to provide a set of factor scores, a first sub-set of impact factors representing complexity of data entities implicated in the first query and a second sub-set of impact factors representing operations of the first query;
  providing a total score for the first query based on the set of weights and the set of factor scores, the total score representing a load that the first query is expected to place on a backend system that executes the first query;
  determining that the total score is different from a threshold request score, and in response, determining a query suggestion to modify the first query wherein the query suggestion is based on at least one of the set of factor scores; and
  returning a first response, a score response comprising the total score and at least one query suggestion.

2. The method of claim 1, wherein the score response is provided in response to the score response being less than the threshold request score.

3. The method of claim 1, wherein each weight in the set of weights is specific to an impact factor and is determined from historical data representing requests submitted through the web services API.

4. The method of claim 1, wherein the at least one query suggestion is specific to an impact factor and is automatically provided as a predefined suggestion that is specific to the impact factor in response to a factor score of the impact factor.

5. The method of claim 1, wherein one of:
the score response is returned with the first response comprising second data that is retrieved from the database system and is responsive to the first query; and
the score response is returned without the first response.

6. The method of claim 1, wherein weights in the set of weights are determined based on historical data that represents requests processed by the backend system in response to one or more calls to the web service API.

7. The method of claim 6, wherein the historical data comprises, for each call of the one or more calls, data representative of entity property count, select count, filter condition count, expand count, database call count, returned records, and resource usage.

8. A non-transitory computer-readable storage medium coupled to one or more processors and having instructions stored thereon which, when executed by the one or more processors, cause the one or more processors to perform operations for evaluating queries received through web service application programming interfaces (APIs) to improve query processing and performance of backend systems, the operations comprising:
receiving a first request through a web services API, the first request comprising a first query to query a database system;
executing the first query to generate a first response;
retrieving a set of weights that is specific to the web services API that the first request is received through;
determining a factor score for each impact factor in a set of impact factors to provide a set of factor scores, a first sub-set of impact factors representing complexity of data entities implicated in the first query and a second sub-set of impact factors representing operations of the first query;
providing a total score for the first query based on the set of weights and the set of factor scores, the total score representing a load that the first query is expected to place on a backend system that executes the first query;
determining that the total score is different from a threshold request score, and in response, determining a query suggestion to modify the first query wherein the query suggestion is based on at least one of the set of factor scores; and
returning a first response, a score response comprising the total score and at least one query suggestion.

9. The non-transitory computer-readable storage medium of claim 8, wherein the score response is provided in response to the score response being less than the threshold request score.

10. The non-transitory computer-readable storage medium of claim 8, wherein each weight in the set of weights is specific to an impact factor and is determined from historical data representing requests submitted through the web services API.

11. The non-transitory computer-readable storage medium of claim 8, wherein the at least one query suggestion is specific to an impact factor and is automatically provided as a predefined suggestion that is specific to the impact factor in response to a factor score of the impact factor.

12. The non-transitory computer-readable storage medium of claim 8, wherein weights in the set of weights are determined based on historical data that represents requests processed by the backend system in response to one or more calls to the web service API.

13. The non-transitory computer-readable storage medium of claim 12, wherein the historical data comprises, for each call of the one or more calls, data representative of entity property count, select count, filter condition count, expand count, database call count, returned records, and resource usage.

14. The method of claim 1, further comprising:
receiving a second request through the web services API, the second request comprising a second query to the database system wherein the second query includes at least a portion of the query suggestion;
executing the second query to generate a second response; and
returning the second response.

15. The method of claim 14 further comprising:
receiving a third request through the web services API, the third request comprising a third query to the database system;
executing the third query to generate a third response; and
returning the third response.

16. A system, comprising:
a computing device; and
a computer-readable storage device coupled to the computing device and having instructions stored thereon which, when executed by the computing device, cause the computing device to perform operations for evaluating queries received through web service application programming interfaces (APIs) to improve query processing and performance of backend systems, the operations comprising:
receiving a first request through a web services API, the first request comprising a first query to query a database system;
executing the first query to generate a first response;
retrieving a set of weights that is specific to the web services API that the first request is received through;
determining a factor score for each impact factor in a set of impact factors to provide a set of factor scores, a first sub-set of impact factors representing complexity of data entities implicated in the first query and a second sub-set of impact factors representing operations of the first query;
providing a total score for the first query based on the set of weights and the set of factor scores, the total score representing a load that the first query is expected to place on a backend system that executes the first query;
determining that the total score is different from a threshold request score, and in response, determining a query suggestion to modify the first query wherein the query suggestion is based on at least one of the set of factor scores; and
returning a first response, a score response comprising the total score and at least one query suggestion.

17. The system of claim 16, wherein the score response is provided in response to the score response being less than the threshold request score.

18. The system of claim 16, wherein each weight in the set of weights is specific to an impact factor and is determined from historical data representing requests submitted through the web services API.

19. The system of claim 16, wherein the at least one query suggestion is specific to an impact factor and is automatically provided as a predefined suggestion that is specific to the impact factor in response to a factor score of the impact factor.

20. The system of claim 16, wherein weights in the set of weights are determined based on historical data that represents requests processed by the backend system in response to one or more calls to the web service API.

\* \* \* \* \*